United States Patent [19]
Katsuno et al.

[11] Patent Number: 5,356,281
[45] Date of Patent: Oct. 18, 1994

[54] SCREW-TYPE RESIN INJECTION APPARATUS FOR INJECTION MOLDING

[75] Inventors: Nobuhiro Katsuno; Toru Shimizu, both of Hachioji, Japan

[73] Assignee: Three Bond Co., Ltd., Japan

[21] Appl. No.: 927,813

[22] Filed: Aug. 10, 1992

[51] Int. Cl.⁵ .................. B29C 45/48; B29C 45/50; B29C 45/60
[52] U.S. Cl. ..................... 425/208; 366/77; 366/81; 366/88; 366/90; 366/322; 366/324; 366/327; 425/209; 425/DIG. 47
[58] Field of Search ............... 425/207, 208, 209, 77, 425/222, DIG. 47; 366/88, 90, 320, 321, 324, 327, 81

[56] References Cited

U.S. PATENT DOCUMENTS

| | | | |
|---|---|---|---|
| 3,652,064 | 3/1972 | Lehnen et al. | 425/208 |
| 3,690,623 | 9/1972 | Boyne | 366/90 |
| 3,858,856 | 1/1975 | Hsu | 366/88 |
| 4,112,516 | 9/1978 | Hotz | 366/88 |
| 4,310,484 | 1/1982 | Blakeslee, III | 425/208 |
| 4,321,229 | 3/1982 | Blakeslee, III et al. | 425/208 |
| 4,329,313 | 5/1982 | Miller et al. | 425/208 |
| 4,652,138 | 3/1987 | Inoue et al. | 366/90 |
| 4,695,165 | 9/1987 | Fukumizu et al. | 425/208 |
| 4,746,220 | 5/1988 | Sukai et al. | 366/88 |
| 4,840,492 | 6/1989 | Nakamura | 366/88 |
| 4,846,659 | 7/1989 | Nakamura | 425/208 |
| 4,966,539 | 10/1990 | Pena | 425/208 |
| 4,981,364 | 1/1991 | Geyer | 366/88 |
| 5,002,717 | 3/1991 | Taniguchi | 425/208 |
| 5,044,759 | 9/1991 | Gagliani | 366/90 |
| 5,215,764 | 6/1993 | Davis et al. | 366/90 |

FOREIGN PATENT DOCUMENTS

| | | | |
|---|---|---|---|
| 2117997 | 10/1971 | Fed. Rep. of Germany | 425/208 |
| 2541738 | 3/1977 | Fed. Rep. of Germany | 425/208 |
| 3200256 | 7/1983 | Fed. Rep. of Germany | 425/208 |
| 48-19702 | 6/1973 | Japan | 425/208 |
| 55-28816 | 2/1980 | Japan | 425/208 |
| 55-28867 | 2/1980 | Japan | 425/208 |
| 57-182414 | 11/1982 | Japan | 425/208 |
| 4-339629 | 11/1992 | Japan | 425/208 |

*Primary Examiner*—Khanh Nguyen
*Attorney, Agent, or Firm*—Samuels, Gauthier & Stevens

[57] ABSTRACT

A screw-type resin injection apparatus for injection molding which includes a cylinder element having a cylinder chamber for receiving resin therein, and having, at an end portion, a nozzle for injecting the resin. A screw element is arranged within the cylinder chamber in a manner allowing rotation and axial movement. A rotary drive shaft is connected to the screw element telescopically so as to be capable of transmitting a torque. The rotary drive shaft is rotatively driven by a motor. A fluid pressure cylinder unit is arranged laterally of the cylinder element in parallel relation thereto. The fluid pressure cylinder unit is rotatably engaged with the screw element to drive the screw axially. Preferably, the screw element is provided with a mixing screw portion which has a screw groove small in pitch and large in lead angle and an axial groove extending axially.

7 Claims, 11 Drawing Sheets

SCREW-TYPE RESIN INJECTION APPARATUS FOR INJECTION MOLDING

BACKGROUND OF THE INVENTION

The present invention relates to screw-type resin injection apparatuses for injection molding and, more particularly, to a screw-type resin injection apparatus for use in an in-line screw-type injection molding system.

An in-line screw-type injection molding system has a screw-type resin injection apparatus for injecting and filling resin (resinous material) into a cavity in a forming mold. Generally, the screw-type resin injection apparatus comprises an injection cylinder element defining therein an injection cylinder chamber and having, at one end thereof, a resin injection nozzle, an injection screw arranged within the injection cylinder chamber in a manner allowing rotation and axial movement, rotatively driving means such as a hydraulic motor, a motor or the like for rotatively driving the injection screw, and a hydraulic injection cylinder unit for axially driving the injection screw. The screw-type resin injection apparatus is arranged as follows. That is, tile injection screw is rotatively driven about its own central axis by the rotatively drive means, whereby the resin is taken into the injection cylinder chamber by a screw pump action. The injection screw is forwardly driven axially by the injection cylinder unit, whereby the resin taken into the injection cylinder chamber is injected toward tile cavity in the forming mold by the resin injection nozzle.

In a conventional screw-type resin injection apparatus, a hydraulic injection cylinder unit for axially driving the injection screw is arranged in series relation to the injection cylinder element, axially of or on the same axis of the injection cylinder element, at a rearward end of the injection cylinder element. For this reason, an entire or overall axial length of the screw-type resin injection apparatus is lengthened in accordance with a requisite amount of axial movement of the injection screw. This obstructs miniaturization design of the screw-type resin injection apparatus, and largely obstacles compactification of the screw-type resin injection apparatus.

Further, generally, an injection screw used in the above-described in-line screw-type injection molding system has a screw-pump acting portion for executing a screw pump action, and a compound portion arranged forwardly more than the screw pump and gradually increasing as a diameter (minor diameter) of a bottom of a screw groove advances forwardly. A resinous material fed by the screw pump acting portion by rotation is kneaded while being compressed at the component portion.

The injection screw arranged as described above is suitable for injection molding of thermoplastic resin, but is not developed for a resinous material having a low viscosity. The injection screw tends merely to compress and mix the resinous material under a single stream or flow in the process of feeding the resinous material by the screw. For this reason, there cannot so be produced an excellent kneading action. This creates a problem in injection molding of a bi-liquid mixing resinous material such as silicon LIM. Particularly, there cannot be produced sufficient kneadability in injection molding of a resinous material of a low viscosity and bi-liquid mixing resin having a large viscosity difference.

Necessity occurs to lengthen an axial length of the injection screw, in order to increase the kneadability. However, extension of the axial length of the injection screw causes large-sizing of the in-line screw-type injection molding system.

Moreover, in the conventional injection screw, compression of the resinous material is executed in a compound portion so that the compound portion acts as a resistance of rotation of the injection screw. This increases the rotational resistance of the injection screw. In addition thereto, in a case where supply of the resinous material such as liquid resin having a low viscosity with respect to the screw portion is required to be forcibly executed by the use of a pressing or forcing unit, an increase in a required material supplying pressure is caused so that the necessity occurs in which the material supply pressure of the pressing unit is raised more than the resinous-material compressing pressure of the compound portion.

Further, it has been considered that, in order to improve the kneadability of the resinous material, a weir is provided at an intermediate portion of the injection screw to divide the injection screw into a plurality of zones in an axial direction.

This, however, also imparts a large or high resistance to the flow of the resinous material, to cause an increase in the required material supply pressure. Furthermore, the weir impedes the flow of the cleaning liquid at cleaning to deteriorate the cleanability within the injection cylinder chamber. Thus, washing away of the resinous material is not executed excellently.

In the injection molding of the bi-liquid mixing resin such as silicon LIM, there is a case where a static mixing mechanism is utilized, not relying upon an in-line screw, in order to mixing of the resinous material.

In a case of the static mixing mechanism, however, a long mixing head for mixing and a high material supply pressure are required because of the static divided mixing. If the resinous material is high in viscosity, a further high material supply pressure is required. Furthermore, there are disadvantage that mixing of a resinous material having a viscosity difference is difficult, and the injection molding apparatus is large-sized. Moreover, in a case of the static mixing mechanism, there is a limit or restriction that the resinous material must be one having a long pot life, because residence time in the mixing zone for the resinous material is long. Further, also in the static mixing mechanism, mixing of the bi-liquid mixing resin having a large viscosity difference is not sufficiently executed.

By the way, it has already been proposed that a gasket forming groove is formed in a Joining or Junction surface portion of the various articles, an uncured liquid gasket agent is filled in the gasket forming groove after assembling, and sealing is executed at the junction surface portion. The sealing of this kind is effectively applied to sealing of the junction surface portion of the various composition or constitutional elements in engines for vehicles or automobiles, electric equipments or instruments, general industrial machines and the like. Particularly, in the engines for vehicles, the sealing is applied to many locations, such as sealing of a junction surface portion between an engine block and a cylinder head cover, the junction surface portion between a transmission case and the engine block, the junction surface portion between an pan and the engine block, the junction surface portion between a timing gear cover and the engine block, the junction surface portion between an oil pump housing and the engine block, the Junction surface portion between a water pump outlet and an engine block, the Junction surface portion between constitutional parts of the differential gear case, and the like.

Conventionally, there has been an injection apparatus, as an apparatus for filling a liquid gasket agent into the gasket forming groove which is formed at the junction surface portion of the article. The injection apparatus is arranged such that the injection apparatus has a force feed pump and a liquid gasket agent supply hose connected to the force feed pump, wherein the liquid gasket agent is fed into the gasket forming groove from the nozzle at the forward end of the hose, through the liquid gasket agent supply hose by the force feed pump. This injection apparatus is disclosed in Japanese Patent Laid-Open No. HEI 2-203082.

In the injection apparatus arranged as described above, it is required that the nozzle at the forward end of the hose is detachably connected to and coupled to an injection port for the liquid gasket agent with respect to the gasket forming groove. This connection and coupling is executed by the fact that a male thread is formed on an outer periphery of the nozzle, a female thread is formed in an inner periphery of the injection port, and the male and female threads are screw-Joined to each other. This, however, is deteriorate in operability, and automatization is made difficult in a manufacturing line. Also in this case, the liquid gasket agent forcibly fed by the forcible feed pump reaches the gasket forming groove through the liquid gasket agent supply hose. Accordingly, a pressure loss is large or high, and there can only be produced an injection pressure of approximately a few tens Kgf/cm$^2$. For this reason, in a case where a liquid gasket agent high in viscosity is injected, necessity occurs that an exhaust port is provided in addition to the injection port, and air within the gasket forming groove is sucked or drawn from the exhaust port by a vacuum pump, to assist fluidity of the liquid gasket agent within the gasket forming groove. If this necessity is not satisfied, the liquid gasket agent does not prevail over the entire gasket forming groove as a whole. Thus, a healthy or sound gasket is not formed.

Further, in the injection apparatus arranged as described above, a liquid gasket agent having rapid hardness such as a double-liquid reaction type cannot be used, because of avoidance of hardness of the liquid gasket agent in the liquid gasket agent supply hose, and a liquid gasket agent capable of being used is limited to a single-liquid liquid gasket agent such as a solvent volatile type and a humidity hardened type. However, these liquid gasket agents are isolated or cut off from outdoor air in the closed gasket forming groove and, accordingly, long time is required for hardening. This will cause reduction of productive efficiency. Furthermore, in addition thereto, a liquid gasket agent of heat hardening type can be used. This case, however, hardening of the liquid gasket agent in the gasket forming groove requires considerably long time also in this case, in order to lengthen a service life under a normal temperature.

SUMMARY OF THE INVENTION

It is therefore an object of the invention to provide a screw-type resin injection apparatus for injection molding, which is capable of being designed considerably compact as compared with a conventional one.

It is another object of the invention to provide a screw for an in-line screw-type injection molding system, which excellently executes mixing and kneading of bi-liquid mixing resin having a large or high viscosity difference and a resinous material having viscosity over a wide range from low viscosity to high viscosity, without the necessity of a long shaft length, and which do not increase a required material supply pressure and do not deteriorate cleanability within an injection cylinder chamber.

It is still another object of the invention to provide a sealant filling apparatus which can supply a liquid gasket agent (liquid sealant) to a gasket forming groove with a high injection pressure, which does not require to suck or draw air in the gasket forming groove from an exhaust port by a vacuum pump also under the use of a liquid gasket agent having high viscosity, which is capable of using a rapid hardened liquid gasket agent such as a bi-liquid reaction type, and which can automatically fill the liquid gasket agent into the gasket forming groove in an article conveyed In a manufacturing line such as an assembly line, with high or superior operability.

According to a first aspect of the invention, we provide a screw-type resin injection apparatus for injection molding, comprising:

a cylinder element having therein a cylinder chamber for receiving therein resin, and having, at an end portion, a nozzle for injecting the resin;

a screw element arranged within the cylinder chamber for rotation and axial movement;

a rotary drive shaft connected to the screw element telescopically so as to be capable of transmitting a torque;

rotary drive means for rotatively driving the rotary drive shaft; and a hydraulic cylinder unit arranged by the cylinder element in parallel relation thereto, the hydraulic cylinder unit being rotatably engaged with the screw element to drive the screw axially.

With the arrangement above-described, the rotary drive shaft and an injection screw or a shaft element integral therewith are inserted into a shaft receiving bore in an insertable and withdrawable manner so that the injection shaft and tile injection screw or the shaft element integral therewith and the shaft receiving bore are expandable and retractable in an axial direction while a torque transmitting relation is maintained as viewed as a whole. The hydraulic cylinder unit for driving the injection screw axially is arranged by the injection cylinder element in parallel relation thereto. Thus, an axial length of the screw-type resin injection apparatus for injection molding is shortened less than the conventional one, by a shaft length of the hydraulic cylinder unit.

According to a second aspect of the invention, we provide a screw for an in-line screw-type injection molding system for injection molding, comprising:

a screw pump acting portion for executing a screw pump action; and a mixing screw portion arranged forwardly of an injecting direction more than the screw pump acting portion, the mixing screw portion having a screw groove smaller in pitch and smaller in lead angle than the screw pump acting portion and an axial groove extending axially.

With the arrangement above-described, the resinous material is sent to the mixing screw portion by rotation of the screw pump acting portion. A portion of the resinous material flows along the screw groove in the mixing screw portion. The remaining resinous material advances along the axial groove, or the like. Thus, a plurality of flows of the resinous material are formed. These flows repeat joining or meeting, and dividing or splitting as the flows advance along the mixing screw portion. Thus, mixing and kneading of the resinous material are executed with high efficiency evenly.

According to a third aspect of the invention, we provide a sealant filling apparatus for filling uncured liquid sealant from a sealant injection port to a gasket forming groove formed in a junction surface portion of an article conveyed by a conveyor unit, the sealant filling apparatus comprising:

an injection unit arranged in an extendible and retractable manner with respect to the article, the injection unit having a nozzle abutted against an outer surface portion of the article by forward movement so as to be selectively connected to the sealant injection port, the nozzle being so formed as to inject the liquid sealant with an injection pressure of the injecting unit;

an injection control unit for controlling the injection unit;

a conveyance drive control unit for controlling driving of the conveyance unit;

an article passage sensor for detecting passage of the article conveyed by the conveyance unit; and a synchronizing control unit for controlling stoppage and reopening of the conveyance unit through the conveyance drive control unit on the basis of a detecting signal from the article passage sensor, and for controlling operation of the injection unit In synchronism with the stoppage and the reopening of the conveyance unit.

With the arrangement above-described, operation of the injection unit is controlled in synchronism with conveyance of the article due to the conveyance unit, by the synchronizing control unit. By this control, the nozzle of the injection apparatus is directly abutted against the outer surface portion of the article with a predetermined contact pressure. The nozzle and the sealant injection port communicate with and are connected to each other by so-called nozzle touch. The liquid sealant is directly injected to the sealant injection port from the nozzle with an injection pressure of the injection apparatus.

DETAILED DESCRIPTION OF THE PREFERRED EMBODIMENTS

Various embodiments of the invention will hereunder be described in detail with reference to the accompanying drawings.

Figure 1:
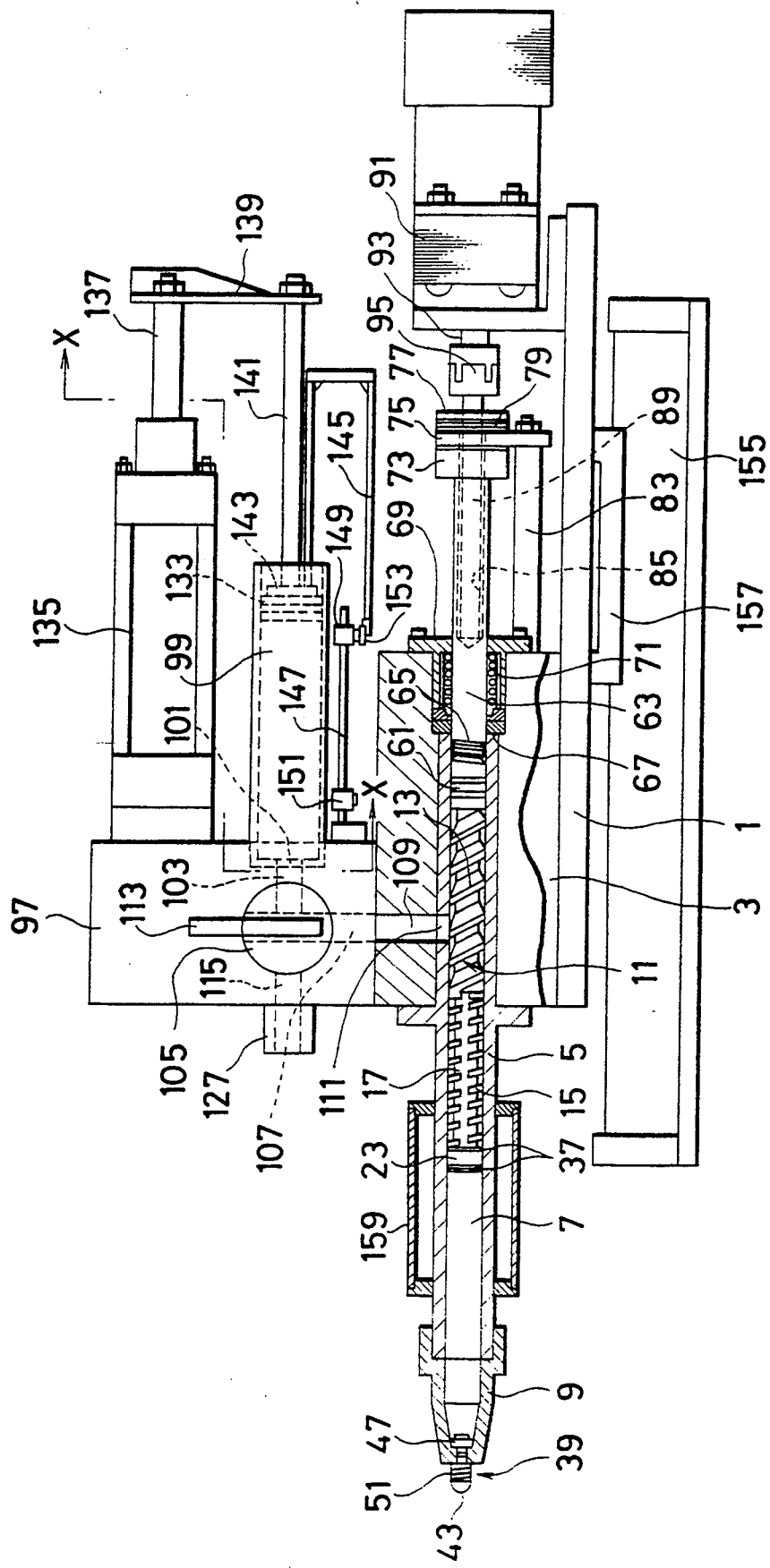
FIG. 1 is a side elevational view showing, in partial cross-section, an embodiment in a case where a screw-type resin injection apparatus for injection molding, according to the invention, is applied as an injection apparatus for resin of bi-liquid reaction effective type such as silicon rubber.
Figure 2:
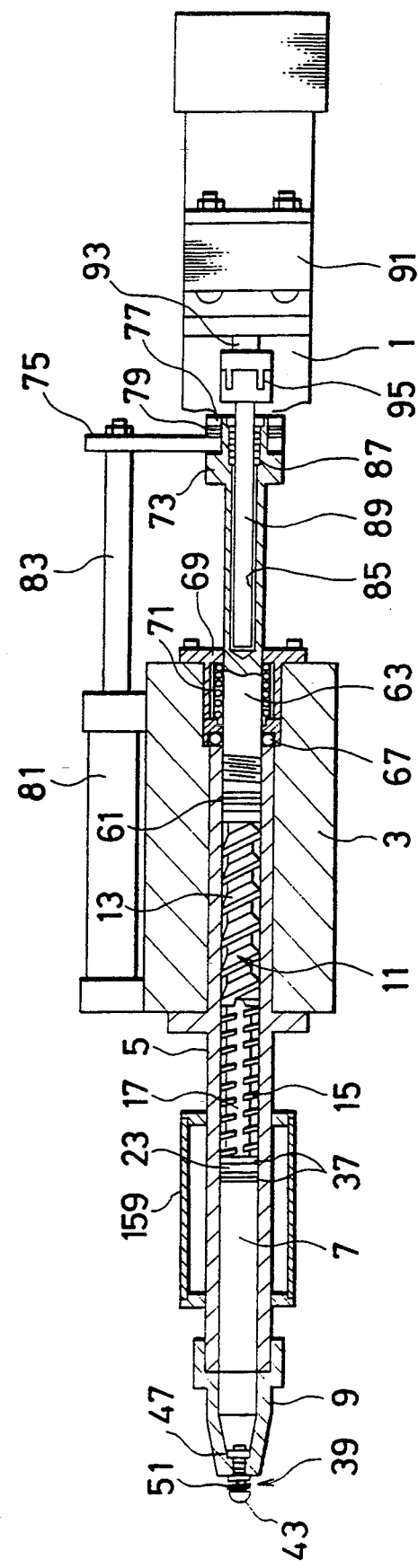
FIG. 2 is a cross-sectional top plan view showing a screw portion of the screw-type resin injection apparatus for injection molding, shown in FIG. 1.

Referring first to FIGS. 1 and 2, there is shown an embodiment in a case where a screw-type resin injection apparatus for injection molding, according to the invention, is applied as an injection apparatus for bi-liquid reaction-hardening resin such as silicon rubber.

The screw-type resin injection apparatus for injection molding has a cylinder fixing base 3 which is fixedly mounted on a forward- and rearward-movement base plate 1. The cylinder fixing base 3 fixedly retains an injection cylinder member or element 5 into a horizontal posture.

The injection cylinder element 5 defines therein an injection cylinder chamber 7. A tapering cylinder head element 9 for retaining an injection nozzle is connected axially or on the same axis to one of both end portions of the injection cylinder element 5.

Figure 3:
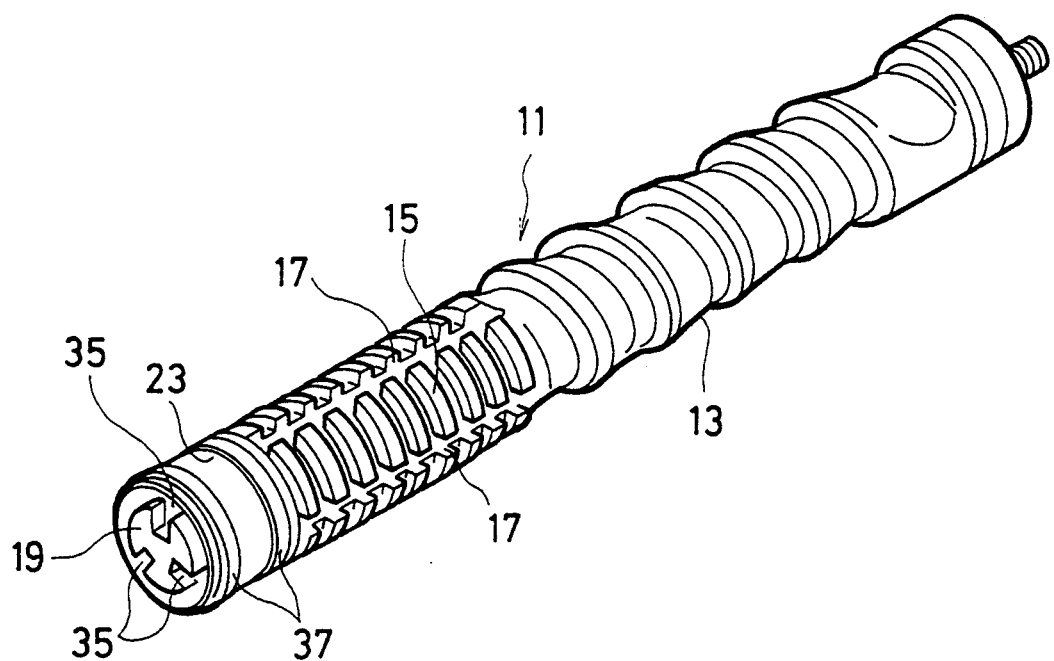
FIG. 3 is a perspective view showing an embodiment of an injection screw which is used in the screw-type resin injection apparatus for injection molding, according to the invention.
Figure 4:
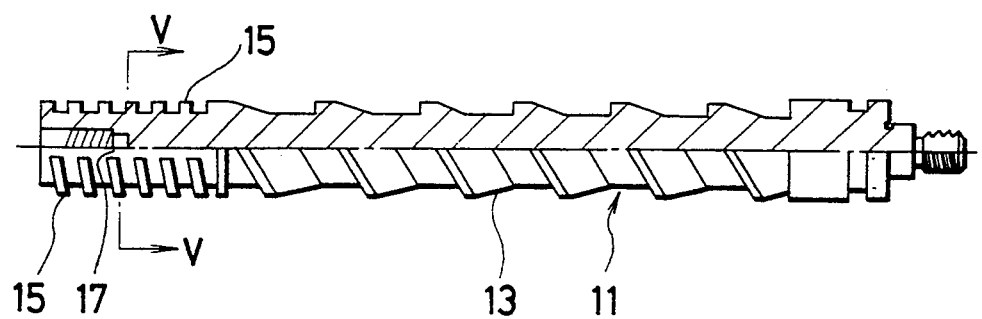
FIG. 4 is a half cross-sectional view showing an embodiment of an injection screw which is used in the screw-type resin injection apparatus for injection molding, according to the invention.
Figure 5:
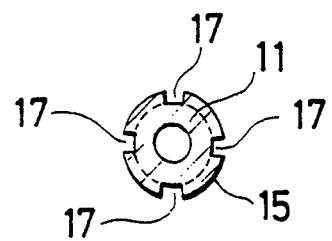
FIG. 5 is a cross-sectional view taken along a line V—V in FIG. 4.

An injection screw 11 is arranged within the injection cylinder chamber 7 in the injection cylinder element 5 so as to be capable of being rotated about a central axis of the injection screw 11 per se and so as to be movable axially. As best shown in FIGS. 3 through 5, the injection screw 11 has a screw pump acting portion 13 in the form of a triangular thread having a relatively large pitch and a large lead angle, and a mixing screw portion 15 arranged in front of the screw pump acting portion 13 and in the form of a square thread having a small pitch and a small lead angle as compared with the screw pump acting portion 13. A plurality of, four (4) in this embodiment, axial grooves 17 each of which has a rectangular cross-section and which have respective depths equal to a screw or thread height are arranged in equidistantly spaced from each other peripherally, over the entire axial region or area of the mixing screw portion 15.

Specifically, the screw pump acting portion 13 may be a non-return triangular thread which has axial length of approximately 90 to 120 mm, a pitch of approximately 15 to 25 mm, preferably, 20 mm, an inclined angle of approximately 15 degree, and a depth of approximately 2.5 to 2.7 mm. The mixing screw portion 15 may be a square thread which has an axial length of approximately 30 to 70 mm, a pitch of approximately 4.5 to 6 mm, and a depth of approximately 2.2 to 2.4 min. Each of the axial grooves 17 may have a groove width of approximately 2.3 to 2.5 mm.

Figure 6:
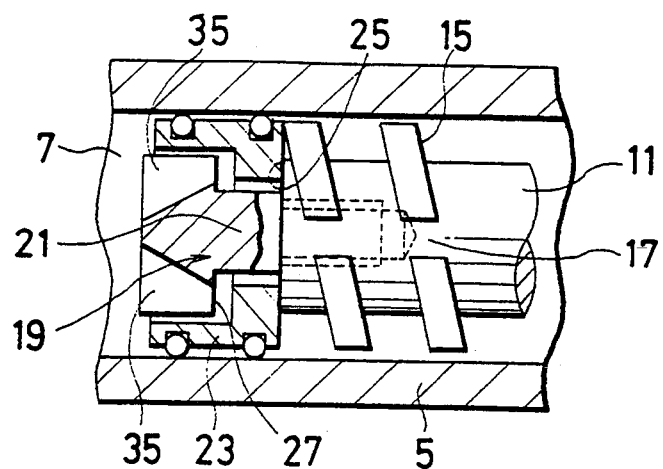
FIG. 6 is an enlarged cross-sectional view showing an embodiment of a seal ring portion which is used in the screw-type resin injection apparatus for injection molding, according to the invention and which is under a closed condition.
Figure 7:
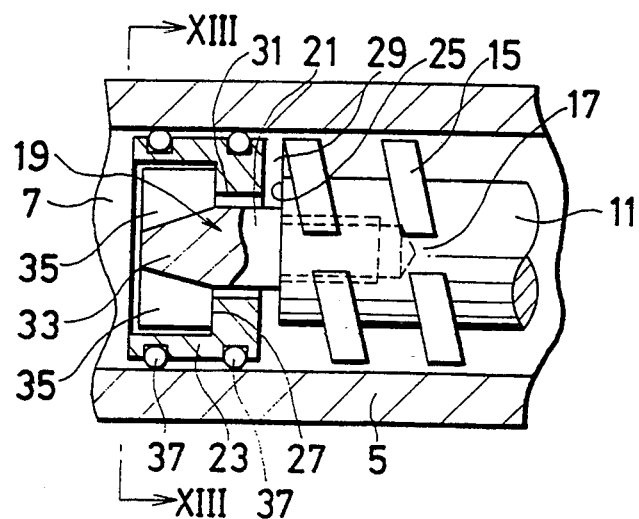
FIG. 7 is an enlarged cross-sectional view showing the seal ring portion shown in FIG. 6 under an open condition.
Figure 8:
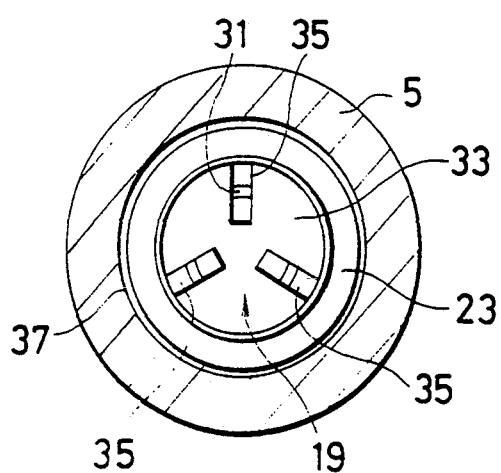
FIG. 8 is a cross-sectional view taken along a line VIII—VIII in FIG. 7.

The injection screw 11 has a forward end portion to which, as shown in FIGS. 6 to 8, a screw head element 19 is fixedly screwed. Further, the screw head element 19 has a shaft portion 21 about which a seal ring element 23 is fitted for axial movement.

The seal ring element 23 is movable axially between a seal seat surface 25 formed by a forward end surface of the injection screw 11 and an end surface 27 of the screw head element 19 opposed to the seal seat surface 25. As shown in FIG. 6, the seal ring element 23 is seated on the seal seat surface 25, whereby communication between a portion of the injection cylinder chamber 7 adjacent to a nozzle and a portion of the injection cylinder chamber 7 adjacent to a screw is cut off. To the contrary, as shown in FIG. 7, the seal ring element 23 is seated on the end surface 27, whereby the portion of the injection cylinder chamber 7 adjacent to the nozzle and the portion of the injection cylinder chamber 7 adjacent the screw communicate with each other by a clearance or gap 29 defined between an end surface of the seal ring element 23 and the seal seat surface 25, a gap 31 between the shaft portion 21 and the seal ring element 23, and a plurality of, three (3) in this embodiment, kerfs 35 formed in a head 33 of the screw head element 19. The reason why the axial grooves 17 and the kerfs 35 are odd numbers and even numbers, respectively, is to shift phases of them from each other, and to accelerate a kneading action. These are relative relationships and, in summary, the axial grooves 17 and the kerfs 35 should be so arranged as to shift in phase.

The seal ring element 23 has an outer periphery on which two (2) O-rings 37 are arranged in axially spaced relation to each other, in order to seal a location between an outer peripheral surface of the seal ring element 23 and an inner peripheral surface of the injection cylinder chamber 7 in the injection cylinder element 5. The reason why the two O-rings 37 are arranged in parallel relation to each other is to prevent the sealing element 23 from being inclined, and this is effective to prevent scuffing.

Figure 9:
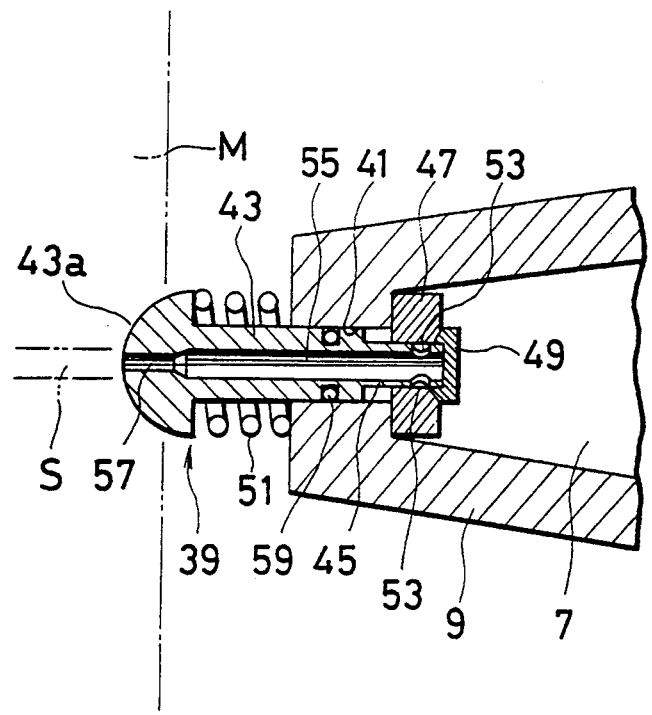
FIG. 9 is a cross-sectional view showing an embodiment of a nozzle unit having a valve, which is used in the screw-type resin injection apparatus for injection molding, according to the invention.

Referring back to FIG. 1, the cylinder head element 9 has a forward end portion on which a nozzle unit 39 having a valve is mounted. As best shown in FIG. 9, the nozzle unit 39 having the valve is provided with a semi-spherical forward end portion 43a. The nozzle unit 39 has a nozzle body 43 inserted in a forward end bore 41 in the cylinder head element 9 for axial movement, a spool valve ring 47 fitted about a thin shaft portion 45 of the nozzle body 43 within the injection cylinder chamber 7 for axial relative displacement, a valve seat element 49 fixed to a rearward end portion of the thin shaft portion 45 and a compressive coil spring 51 biasing the nozzle body 43 toward a valve closing position, that is, toward a left in the figure with respect to the cylinder head element 9. The nozzle body 43 is relatively moved to the right in the figure with respect to the cylinder head element 9, against a spring force of the compressive coil spring 51, by a touch pressure with respect to a forming mold , whereby the valve seat element 49 is spaced away from abutment between the valve seat element 49 and the spool valve ring 47 so that a plurality of valve bores 53 formed in the thin shaft portion 45 radially are exposed with respect to the cylinder chamber 7. The valve bores 53 communicate with a guide bore 55 extending axially through a central portion of the nozzle body 43 and a nozzle bore 57 continuous to the guide bore 55 so as to lead or guide injecting resin within the cylinder chamber 7 to the nozzle bore 57 through the guide bore 55.

Further, the nozzle body 43 has an outer periphery thereof about which a sealing O-ring 59 is provided.

As shown in FIGS. 1 and 2, an O-ring 61 for preventing the resin from escaping or leaking rearwardly is provided at a location adjacent to a rearward end of the injection screw 11.

The injection screw 11 has a rearward end portion to which a plunger shaft 63 is fixedly connected coaxially. An inverse or reverse screw 65 for preventing the resin from leaking rearwardly is formed on an outer periphery of a portion where the plunger shaft 63 is fitted in the injection cylinder element 5. Furthermore, a mechanical seal 67 is arranged between the plunger shaft 63 and the cylinder fixing base 3.

The plunger shaft 63 projects rearwardly from the rearward end portion of the injection cylinder element 5. The projecting portion of the plunger shaft 63 is supported by a linear motion bearing 71 held or retained by a bearing support element 69 fixed to the cylinder fixing base 3, for rotation about a central axis of the projecting portion per se and for axial movement.

A flange 73 is provided adjacent to the rearward end of the plunger shaft 63. As best shown in FIG. 2, connected to an outer periphery of a portion of the plunger shaft 63 adjacent to the rearward end thereof is one end of a drive arm 75 for relative rotation and for axial movement with a needle thrust bearing 79 nipped between an end ring 77 fixedly mounted on the plunger shaft 63 and the flange 73.

As best shown in FIG. 2, the drive arm 75 extends radially of the injection cylinder element 5, and is connected, at a forward end portion thereof, to a forward end portion of a cylinder rod 83 of a pneumatic cylinder unit 81. The pneumatic cylinder unit 81 is arranged by the injection cylinder element 5 in parallel relation thereto, and is fixedly mounted on a side wall of the cylinder fixing base 3.

The plunger shaft 63 has a rearward end thereof at which a shaft receiving bore 85 is formed. The shaft receiving bore 85 extends axially along a central portion of the plunger shaft 63, and opens to a rearward end surface of the plunger shaft 63. A rotary drive shaft 89 is inserted in the shaft receiving bore 85 so as to be capable of being inserted into and retracted from the shaft receiving bore 85.

In other words, the plunger shaft 63 and the rotary drive shaft 89 are engaged with each other in a telescoping manner. A linear motion bearing 87 of torque transmitting type is arranged between the plunger shaft 63 and the rotary drive shaft 89. Thus, tile plunger shaft 63 and the rotary drive shaft 89 are engaged with each other in a torque transmitting relation, so that rotation of the rotary drive shaft 89 is transmitted to the plunger shaft 63.

The rotary drive shaft 89 is connected to an output shaft 93 of a motor 91 fixedly mounted on the forward- and rearward-movement base plate 1, by a coupling 95 in a torque transmitting relation, and is rotatively driven by the motor 91.

Figure 10:
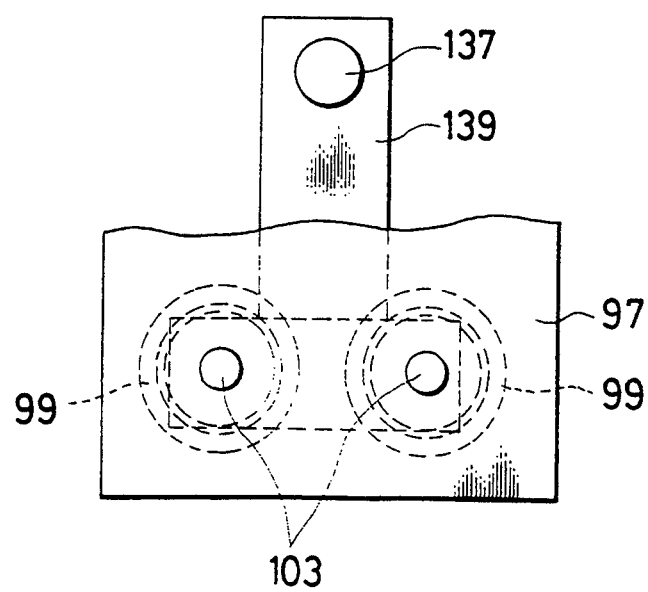
FIG. 10 is an enlarged cross-sectional view taken along a line X—X in FIG. 1.

Referring back to FIG. 1, a resin supply block 97 is fixedly mounted on the cylinder fixing base 3. As shown in FIG. 10, a pair of resinous-material supply tubes 99 are mounted in parallel relation to each other on the resin supply block 97, in order for injection molding of bi-liquid (for example, double-liquid) reaction hardening resin. The resinous-material supply tubes 99 serve also as metering cylinders in this embodiment. The resinous-material supply tubes 99 communicate respectively with a pair of resin passages 103 provided in the resin supply block 97, by a pair of resin discharge ports 101 (FIGS. 1 and 11) in the respective forward ends. The resin passages 103 selectively communicate with a resin passage 107 in the resin supply block 97, a resin passage 109 in the cylinder fixing base 3, and a resin supply port 111 provided in an intermediate portion of the injection cylinder element 5, through a rotary valve 105 arranged within the resin supply block 97.

Figure 11:
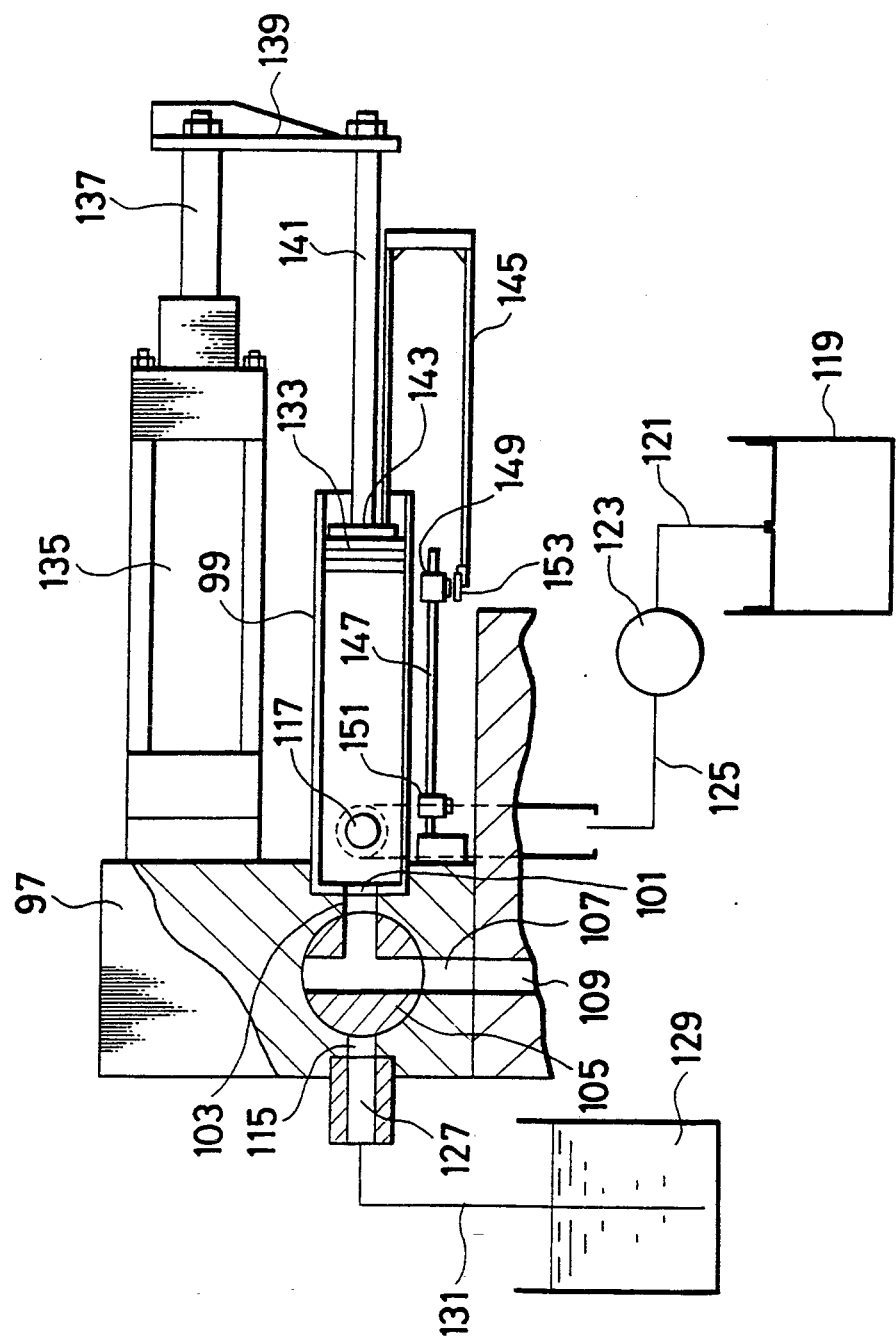
FIG. 11 is a partially cross-sectional view showing an embodiment of a resinous-material supply section of the screw-type resin injection apparatus for injection molding, according to the invention.

The rotary valve 105 is of a manually operable type rotatively operated by a manual lever 113. In a rotary position shown in FIGS. 1 and 11, communication between the resin passages 103 and the resin passage 107 is established. When the rotary valve 105 is rotated clockwise in the figure through 90 degrees from the rotary position shown in FIGS. 1 and 11, a cleaning-solvent passage 115 formed in the resin supply block 97 communicates with and is connected to the resin passages 103 and the resin passage 107. When the rotary valve 105 is rotated clockwise in figure through 180 degrees from the rotary position as shown in FIGS. 1 and 11, communication between the resin passages 103 and the resin passage 107 is cut off so that the cleaning solvent passage 115 communicates with and is connected to the resin passage 107, and communication between the resin passages 103 and the resin passage 107 is cut off so that the cleaning solvent passage 115 communicates with and is connected to the resin passages 103. Moreover, when the rotary valve 105 is rotated clockwise through 270 degrees, communication between the resin passages 103 and the resin passage 107 is cut off so that the cleaning solvent passage 115 communicates with and is connected to the sealant passage 103.

As shown in FIG. 11, each of the resinous-material supply tubes 99 has, at a forward end thereof, a resin intake port 117. A liquid resinous material is supplemented or made up from a corresponding one of a pair of tanks 119 to the resin intake port 117 through corresponding ones of a pair of resin supply pipes 121, a pair of closing valves 123 and a pair of resin supply pipes 125.

The cleaning solvent passage 115 communicates with a cleaning solvent supply port 127 which is provided in the resin supply block 97. Thus, the cleaning solvent is supplied from a cleaning solvent tank 129 through a cleaning-solvent supply pipe 131.

A pair of pistons 133 are fitted respectively in the resinous-material supply tubes 99. Movement of the pistons 133 to the left in the figure causes the resinous material within the resinous-material supply tubes 99 to be discharged to the resin passages 103 from the resin discharge openings 101, respectively.

A pneumatic cylinder unit 135 for forcibly feeding the resinous material is mounted on the resin supply block 97 in parallel relation to the resinous-material supply tubes 99. The pneumatic cylinder unit 135 for forcibly feeding the resinous material has a connecting plate 139 which is mounted at a forward end of a piston rod 137. A pair of push rods 141 have respective one ends thereof which are fixedly connected to the connecting plate 139. A pair of push pads 143 are mounted respectively on the forward ends of the push rods 141. The push pads 143 are abutted respectively against the pistons 133 within the respective resinous-material supply tubes 99 to urge the pistons 133 to the left in the figure.

A pair of U-shaped position detecting rods 145 are mounted on the push pads 143, respectively. A pair of switch support rods 147 are mounted on the resin supply block 97 in parallel relation to the resinous-material supply tubes 99. A pair of proximity switches 149 and 151 are mounted on each of the switch support rods 147 for adjustment of a mounting position. The proximity switches 149 and 151 execute switching by access or proximity of a switch responsive element 153 which is mounted on a forward end of a corresponding one of the position detecting rods 145. Thus, an axial position of the push pad 143, i.e., the piston 133 of the resinous-material supply tube 99 is monitored.

Referring back to FIG. 1, the forward- and rearward-movement base plate 1 is connected to a movable plate 157 of a rodless pneumatic cylinder unit 155, and is moved forwardly and rearwardly by the rodless pneumatic cylinder unit 155.

At a portion of the injection cylinder element 5 where the latter is exposed to the outside at the forward side, a cooling Jacket 159 is mounted to prevent the resin within the injection cylinder chamber 7 from being cured or hardened, in the present embodiment.

With the arrangement described above, at injection of the resin with respect to the forming mold, the pneumatic cylinder unit 135 for forcibly feeding the resinous material is first driven under a condition where the rotary valve 105 is in a rotary position as shown in FIG. 1 or FIG. 11. The pistons 133 of the respective resinous-material supply tubes 99 are urged toward the left in figures by the push rods 141 and the push pads 143, respectively. Thus, the resinous material within the resinous-material supply tubes 99 is sent into the injection cylinder chamber 7 in the injection cylinder element 5 by the resin supply port 111 through the resin passage 103, the rotary valve 105 and the resin passages 107 and 109. In attendance therewith, the rotary drive shaft 89 is rotatively driven by the motor 91. Rotation of the rotary drive shaft 89 is transmitted to the plunger shaft 63 and the injection screw 11 by the linear motion bearing 87 of torque transmitting type. Thus, the plunger shaft 63 and the injection screw 11 are rotated about their own central axes. The resinous material sent into the injection cylinder chamber 7 is forcibly fed forwardly within the injection cylinder chamber 7, that is, to a portion of the mixing screw portion 15, by the screw pump action due to the screw pump acting portion 13 of the injection screw 11.

The mixing screw portion 15 is provided with the axial grooves 17 over the entire area of the mixing screw portion 15 in the axial direction thereof. Accordingly, the resinous material from the resinous-material supply tubes 99 forcibly fed to the mixing screw portion 15 flow partially along the screw grooves In the mixing screw portion 15 while being subject to a compressive action. The remaining resinous material advances along the axial grooves 17, and the like, so that a plurality of flows are formed. It is repeated that the plurality of flows are met or Joined to each other, and are divided or split. Thus, kneading of the resinous material from tile resinous-material supply tubes 99 is executed with high efficiency evenly or equally.

The kneaded resinous material reaches the forward end portion of the injection screw 11, urges the seal ring clement 23 to the left in the figure, pushes the seal ring element 23 to open the same, and flows toward the nozzle of the cylinder chamber 7 through the gap 29, tile gap 31 and the kerfs 35 in the screw head element 19.

In connection with tile above, at this time, the seal ring element 23 is not rotated by resistance due to the O-rings 37, and only the injection screw 11 and the screw head clement 19 are rotated. Thus, the seal ring element 23 and the injection screw 11 are rotated relatively to each other. By doing so, it is ensured that the seal ring element 23 is open, and the gap 29 as a resin passage is ensured.

In response to the fact that the resinous material is filled in a portion of the injection cylinder chamber 7 adjacent to the nozzle, a reaction thereof acts on the injection screw 11 as a right-hand force in the figure. Thus, the injection screw 11 and the plunger shaft 63 are retracted or moved rearwardly to the right in the figure. The rearward movement is executed with a low resistance under guidance due to the linear motion bearing 71. By this rearward movement, an amount of admission of the rotary drive shaft 89 with respect to the shaft receiving bore 85 increases. Even under axial relative movement between the plunger shaft 63 and the rotary drive shaft 89, rotation of the rotary drive shaft 89 due to the motor 91 is transmitted, without a hitch, to the drive plunger shaft 63 and the injection screw 11 by the linear motion bearing 87 of torque transmission type.

Further, at this time, in order to assist the backward movement of the injection screw 11, the injection screw 11 is lightly driven together with the plunger shaft 63, by the pneumatic cylinder unit 81, and a backward movement force may be given to the injection screw 11. In this case, although the plunger shaft 63 is rotated, the drive arm 75 and the plunger shaft 63 are rotatable relatively to each other by the thrust needle bearing 77. Accordingly, rotary driving and axial driving of the plunger shaft 63 are compatible with each other without hindrance.

When a predetermined amount of resinous material is filled within the injection cylinder chamber 7, rotation of the injection screw 11 due to the motor 91 is stopped, and discharge of the resinous material from the resinous-material supply tubes 99 due to the pneumatic cylinder unit 135 is stopped. The forward- and rearward-movement base plate i is subsequently moved forwardly by the rodless pneumatic cylinder unit 155. Thus, the cylinder fixing base 3, the injection cylinder element 5 and the injection screw 11 are moved forwardly as a whole. As shown in FIG. 9, the nozzle body 43 is abutted against the forming mold M. The nozzle bore 57 communicates with a sprue in the forming mold M. The forward- and rearward-movement base plate 1 is further moved forwardly, whereby the cylinder head element 9 is moved forwardly with respect to the nozzle body 43. Thus, the valve seat element 49 Is spaced away from the abutment against the spool valve ring 47. The valve bore 53 is exposed with respect to the injection cylinder chamber 7. The injection cylinder chamber 7 communicates with the nozzle bore 57 through the guide bore 55.

The injection screw 11 is subsequently driven forwardly by the pneumatic cylinder unit 81. Then, the seal ring element 23 is first moved rearwardly with respect to the screw head element 19 by the pressure of the resinous material within the injection cylinder chamber 7, and is seated on the seal seat surface 25. Thus, communication 5 between a location adjacent to the nozzle of the injection cylinder chamber 7 and a location adjacent to the screw thereof is cut off. The injection screw 11 is further moved forwardly, whereby the injection screw 11 acts as a piston. A forward propelling force of the injection screw 11 due to the pneumatic cylinder unit 81 is converted into an injection pressure with respect to the resinous-material within the injection cylinder chamber 7. The resinous material within the injection cylinder chamber 7 is injected to the sprue S of the forming mold M by the nozzle bore 57.

At this time, backflow tends to occur in which the resinous material within the injection cylinder chamber 7 leaks rearwardly and flows back through a gap between the outer periphery of the seal ring element 23 and the inner peripheral surface of the injection cylinder chamber in the injection cylinder element 5. However, the gap is sealed by the O-rings 37. Accordingly, occurrence of the backflow can be avoided. Thus, a pressure loss runs short so that there can be produced a high injection pressure. This is particularly useful in injection molding of liquid resin which is low in viscosity, which is high fluidity, and in which backflow is apt to occur.

In injection molding of bi-liquid reaction hardening type resin such as silicon rubber, if the resinous-material mixed in the resin passages 107 and 19, the resin supply port 111, the injection cylinder chamber 7 and the like remains stationary over equal to or more than a predetermined period of time, hardening reaction occurs with respect to the resin. Accordingly, in a case where injection is halted for a predetermined period of time, or the like, the rotary valve 105 is switched. The cleaning solvent within the cleaning solvent tank 129 flows from the cleaning-solvent supply port 127 into the resin passages 107 and 109, the resin supply port 111, the injection cylinder chamber 7 and the like. Thus, tile resin passages 107 and 109, the resin supply port 111, the injection cylinder chamber 7 and the like can simply be cleaned by the cleaning solvent. In this case, the injection screw 11 is not provided with a weir or the like, and has no obstacle. Accordingly, cleaning of the injection cylinder chamber 7 due to the cleaning solvent is excellently executed.

Figure 13:
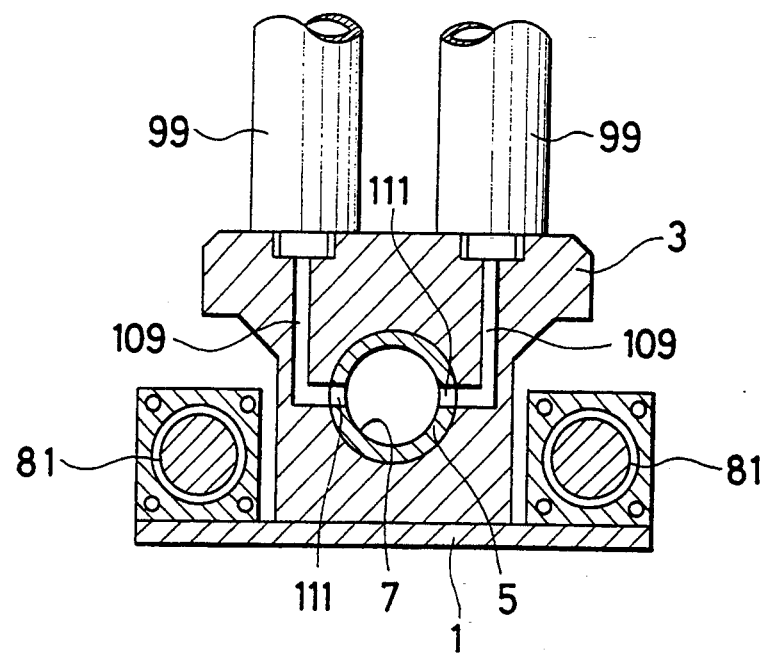
FIG. 13 is a cross-sectional view taken along a line XIII—XIII in FIG. 12.
Figure 12:
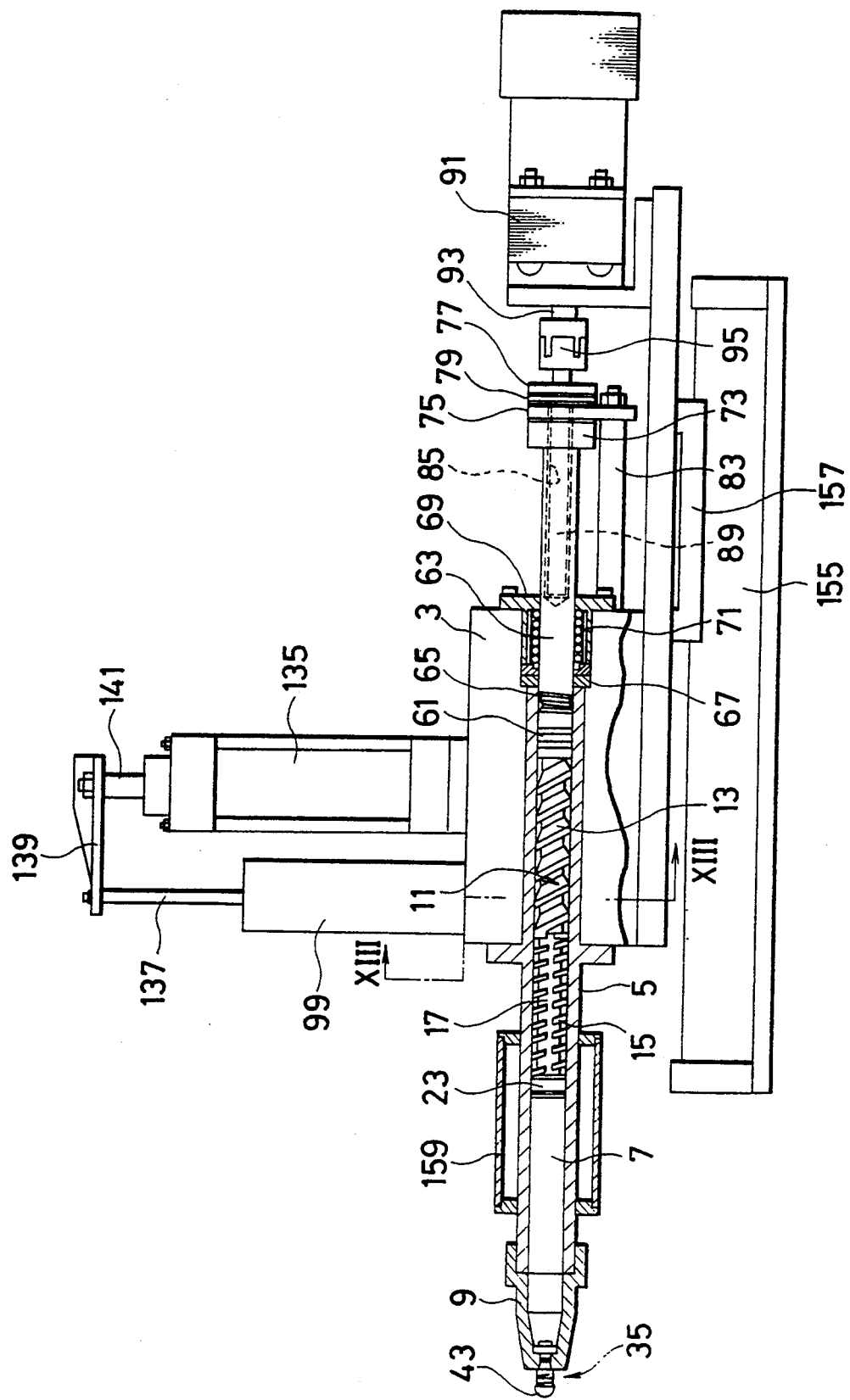
FIG. 12 is a side elevational view showing, in partial cross-section, another embodiment in a case where the screw-type resin injection apparatus for injection molding, according to the invention, is applied as an injection apparatus for resin of bi-liquid reaction effective type such as silicon rubber.

FIGS. 12 and 13 show another embodiment in a case where a screw-type resin injection apparatus for injection molding according to the invention is applied as an injection unit for bi-liquid reactive hardening type resin such as silicon rubber. In this connection, in FIGS. 12 and 13, parts and portions corresponding to those illustrated in FIGS. 1 and 2 are designated by reference numerals the same as those indicated in FIGS. 1 and 2.

In this embodiment, two resinous-material supply tubes 99 and two resinous-material forcible feeding pneumatic cylinder units 135 are mounted vertically on a cylinder fixing base 3.

The two resinous-material supply tubes 99 communicate individually with and are connected individually to two resin supply ports 111 which are individually formed in an injection cylinder element 5 by individual resin passages 109 formed in the cylinder fixing base 3.

Further, in the present embodiment, a pair of pneumatic cylinder units 81 for axially driving a pair of injection screws 11 are arranged respectively on both sides of the cylinder fixing base 3 in parallel relation to the injection cylinder element 5.

Other structure and arrangement are substantially the same as those of the above-described embodiment. In view of this, the present embodiment can produce function and advantages the same as those of the above-described embodiment.

In any of the above-described embodiments, engagement between the plunger shaft 63 and the rotary drive shaft 89 in the torque transmission relation is executed by the linear motion bearing 87 of torque transmission type. However, this may be executed by spline coupling, slide key coupling or the like.

Figure 14:
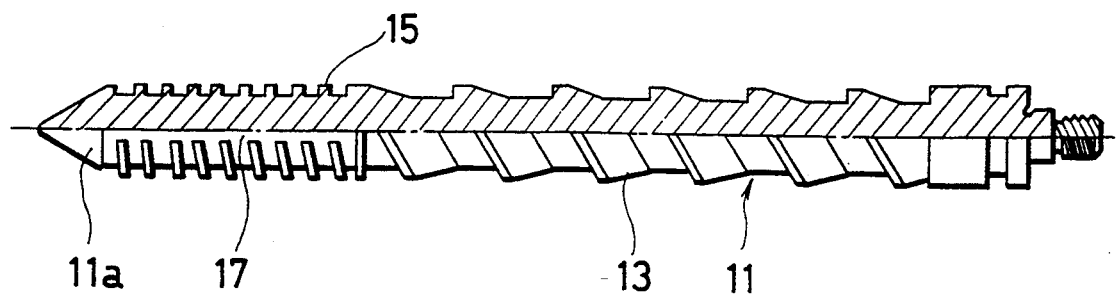
FIG. 14 is a half cross-sectional view showing another embodiment of a screw for an in-line screw-type injection molding system according to the invention.

FIG. 14 shows still another embodiment of a screw for an in-line screw type injection molding system according to the invention. In the present embodiment, an injection screw 11 is not provided with a seal ring mechanism serving as a gate. However, the injection screw 11 has a pointed forward end 11a.

Even in the present embodiment, similarly to the above-described embodiments, the injection screw 11 has a screw pump acting portion 13 in the form of a triangular thread having a relatively large pitch and a large lead angle, and a mixing screw portion 15 arranged in front of the screw pump acting portion 13 and in the form of a square thread having a small pitch and a small lead angle as compared with the screw pump acting portion 13.

Accordingly, also in the present embodiment, there can be produced function and advantages similar to those of the above-described embodiments.

Figure 15:
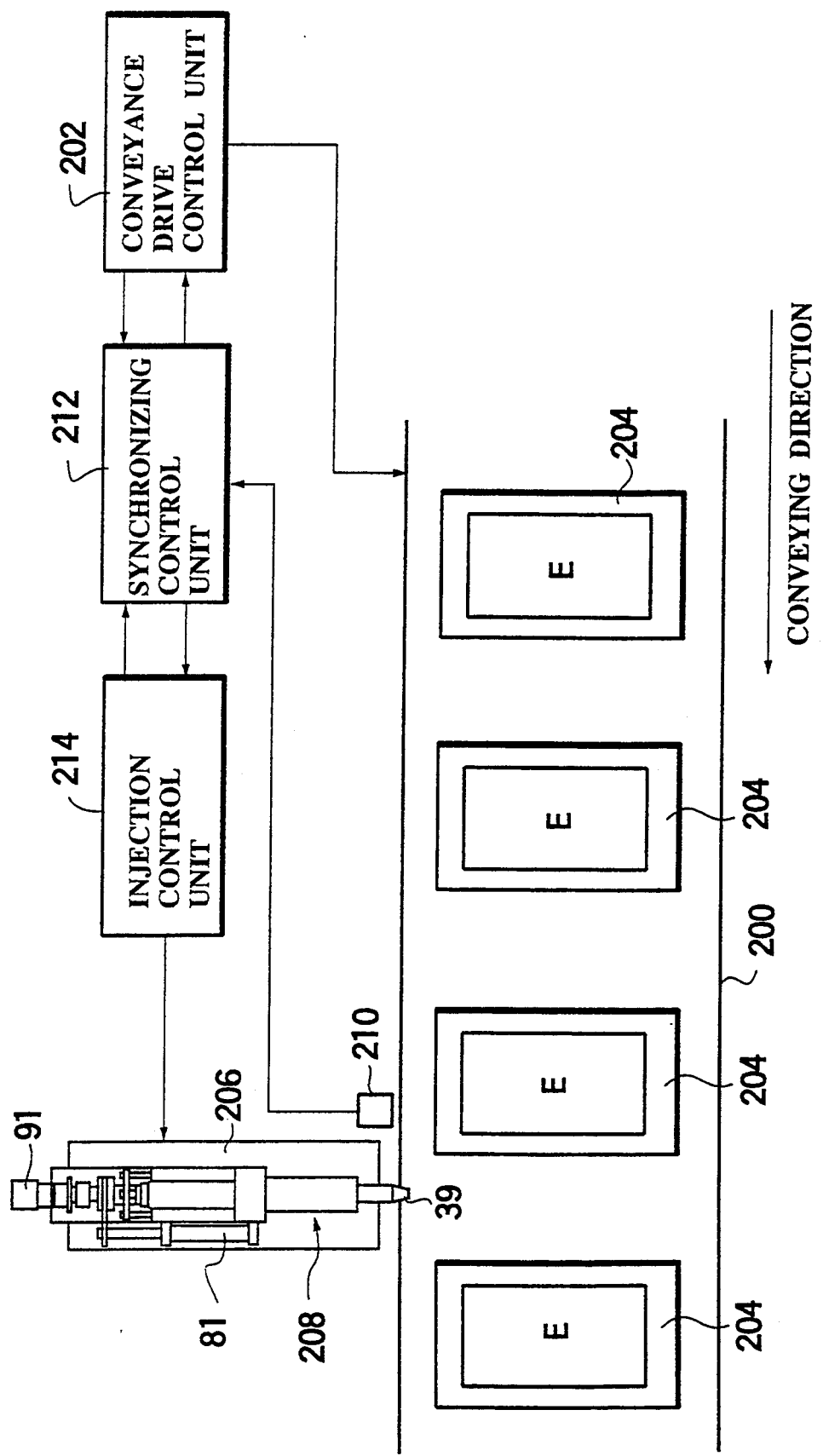
FIG. 15 is a top plan view showing an embodiment in which a sealant filling unit according to the invention is applied to formation of a cylinder-head cover gasket, in an assembly line for vehicle engines.

FIG. 15 shows an embodiment in which a sealant filling unit according to the invention is applied to formation of a cylinder head cover gasket, in an assembly line for automobile or vehicle engines. In FIG. 15, the reference numeral 200 denotes a conveyor in the assembly line for the automobile engines. The conveyor 200 is controlled in carrying operation by a carrying drive control unit 202. Engine assemblies positioned and mounted respectively on pallets 204 are carried intermittently to the left in the figure.

Figure 16:
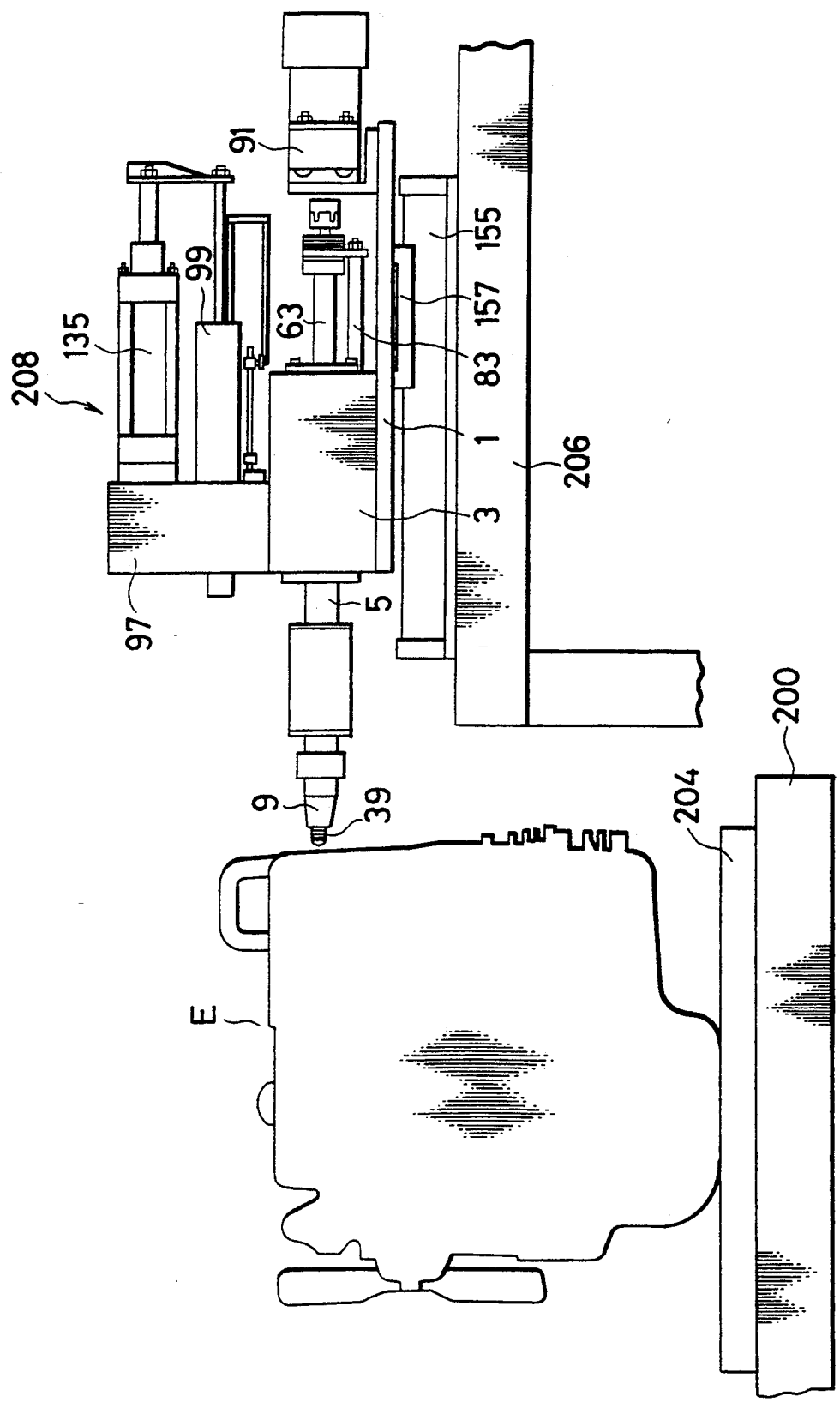
FIG. 16 is a side elevational view showing an arrangement state or condition of a sealant filling unit for forming a cylinder-head cover gasket in an assembly line for vehicle engines, shown in FIG. 1.
Figure 17:
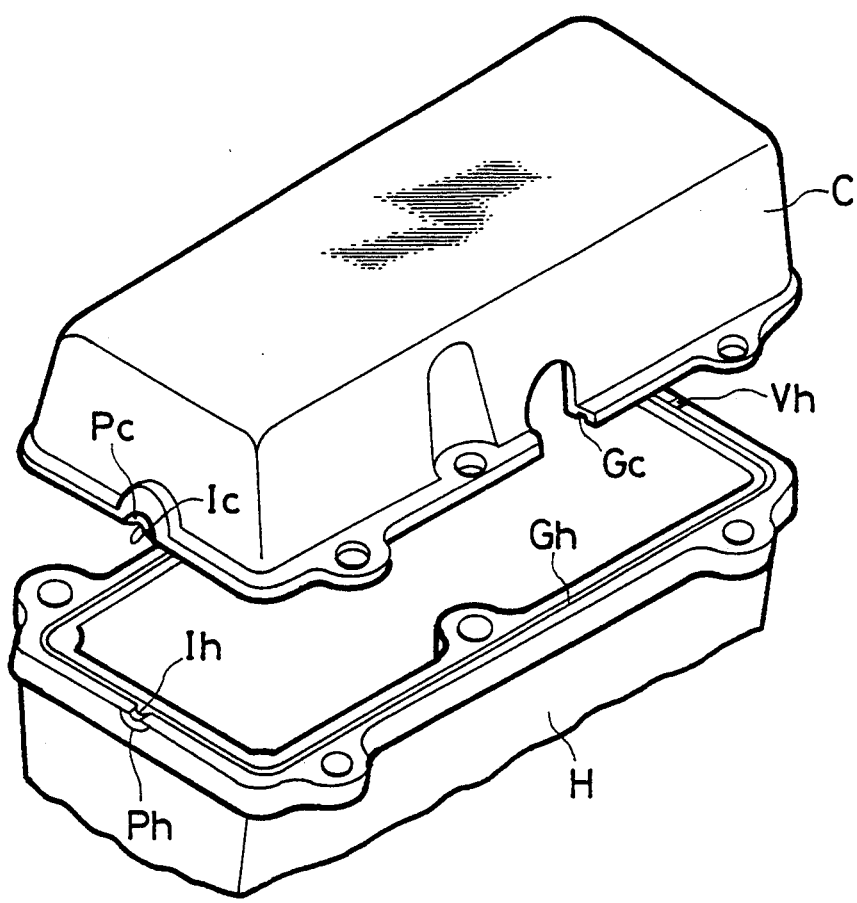
FIG. 17 is a perspective view schematically showing a section for forming a cylinder-head cover gasket for vehicle engines.

The conveyor 200 has one side thereof on which one working station is located. A injection apparatus 208 is arranged on the working station by a pedestal 206. The injection apparatus 208 is so arranged as to inject a liquid sealant into a pair of gasket forming grooves Gh and Gc, in order to form the cylinder head cover gasket, as illustrated in FIGS. 16 and 17. The gasket grooves Gh and Gc are so formed as to be aligned with a joining surface of a cylinder head and a joining surface of a cylinder head cover of the engine E to each other.

Figure 18:
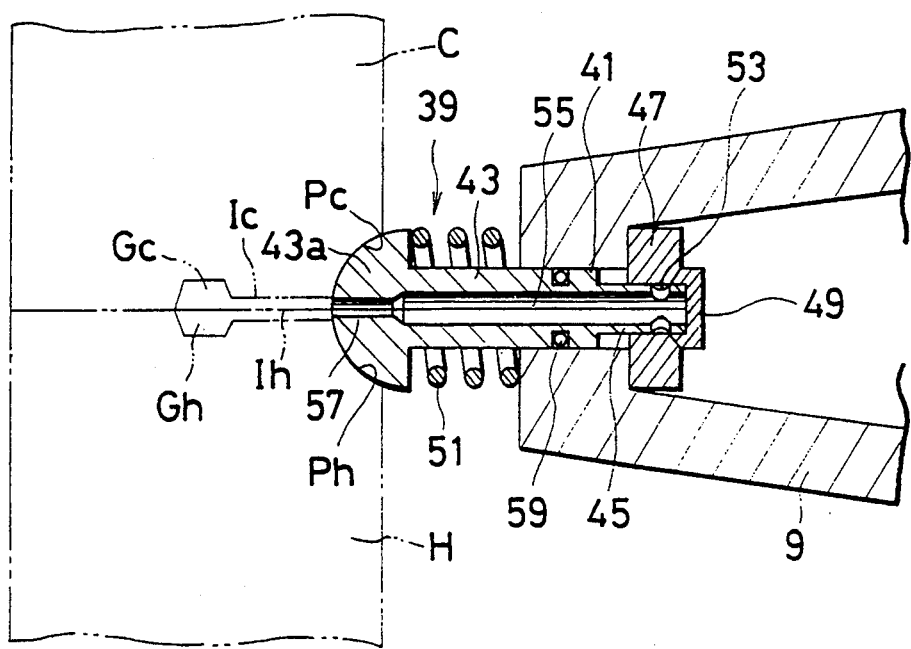
FIG. 18 is a cross-sectional view showing an embodiment of a nozzle unit having a valve, which is used in a sealant filling unit according to the invention.

As shown in FIGS. 17 and 18, a pair of sealant injection ports Ih and Ic communicating respectively with the gasket forming grooves Gh and Gc are formed in the joining surfaces of the respective cylinder head and cylinder head cover C of the engine assembly E. The sealant injection ports Ih and Ic have respective opening ends with respect to an outer wall of tile cylinder head H and an outer wall of the cylinder cover C. The opening ends of the respective sealant injection ports Ih and Ic are formed respectively into a pair of semicircular recesses Ph and Pc which receive hemispherical forward end portions 43a of a nozzle body 43. Further, a pair of air vent bores Vh communicating respectively with the gasket forming grooves Gh and Gc are formed respectively at locations opposite to the sealant injecting ports Ih and Ic.

As best shown in FIG. 16, a forward- and rearward-movement base plate 1 is connected to a moving table 157 of a rodless pneumatic cylinder unit 155 which is fixedly mounted on a pedestal 206. The forward- and rearward-movement base plate 1 is reciprocally moved forwardly and rearwardly by the rodless pneumatic cylinder unit 155.

As shown in FIG. 15, an optical article-passage sensor 210 is arranged at a location upstream of the arrangement position of the injection apparatus 208 as viewed in a pallet carrying direction of the conveyor 200. The article passage sensor 210 detects passage of the pallets 204 at a location in front of the arrangement position of the article passage sensor 210, or passage of the engines E which are positioned and arranged respectively on the pallets 204, in a non-contact manner, and outputs a detecting signal to a synchronizing control unit 212.

The synchronizing control unit 212 may be an electric control unit Including a microcomputer. The synchronizing control unit 212 is arranged as follows. That is, the synchronizing control unit 212 outputs a carrying stop command to the carrying drive control unit 202 in order to stop carrying of the engines E at a location where the hemispherical recesses Ph and Pc in each of the engines E on the pallets 204 are Just aligned with the nozzle body 43 of the injection apparatus 208, on the basis of the detecting signal indicative of passage of articles, from the article passage sensor 210. When a signal indicative of carrying stop completion is given from the carrying drive control unit 202, a command signal indicative of the forward movement of the injection apparatus 208 due to the rodless pneumatic cylinder unit 155 is outputted to an injection control unit 214. When a signal indicative of an injection completion is given from the injection control unit 214, a carrying restart command is outputted to the carrying drive control unit 202 in order to restart carrying of the engines E.

The injection control unit 214 is given a forward movement command signal as a start-up signal from the synchronizing control unit 212, whereby the injection control unit 214 executes sequence control of injection operation on the basis of predetermined procedure in the following manner, and outputs a injection complete signal to the synchronizing control unit 212 at injection completion. That is, the injection control unit 214 can be so set that an amount of injection due to stroke control of an injection screw 11 of the injection unit 208, a rotating speed of the injection screw 11, and the like can freely be altered or changed within a predetermined tolerance, as a parameter set by a user.

When the injection control unit 214 inputs the forward movement command signal as a start-up signal by the synchronizing control unit 212, a resinous-material forcible-feeding pneumatic cylinder unit 135 is first driven under a condition that the rotary valve 105 is in a rotary position shown in FIG. 1 or FIG. 11. As described previously, the sealant is sent to the injection cylinder chamber 7 and is kneaded by the mixing screw portion 15. Subsequently, the kneaded sealant flows toward the nozzle of the injection cylinder chamber 7, as described previously. When a predetermined amount of sealant is filled within the injection cylinder chamber 7, discharge of the sealant from the sealant supply tubes 99 is stopped as described previously. Subsequently, the forward- and rearward-movement base plate 1 is moved forwardly by the rodless pneumatic cylinder unit 155. Thus, the cylinder fixing base 3, the injection cylinder element 5 and the injection screw 11 are moved forwardly as a whole. The forward end portion 43a of the nozzle body 43 is fitted in the hemispherical recesses Ph and Pc in the engine on the pallet 204 which has already been positioned forwardly, as shown in FIG. 18. Thus, the nozzle bore 57 communicates with the sealant injection ports Ih and Ic.

The forward- and rearward-movement base plate 1 is further moved forwardly, whereby, as described previously, the injection cylinder chamber 7 communicates with the nozzle bore 57. Subsequently, when the injection screw 11 is driven forwardly by the pneumatic cylinder unit 81, the sealant within the injection cylinder chamber 7 is injected into the sealant injection ports Ih and Ic from the nozzle bore 57, as described previously. Thus, the sealant is filled within the basket forming grooves Gh and Gc.

What is claimed is:

1. An injection screw for an in-line screw-type injection molding system for mixing and kneading moldable materials, said injection screw having first and second threads extending in the same direction and arranged respectively along the screw axis adjacent to a rear material receiving portion and a front material discharge portion, the improvement comprising:
    said first thread having lead surfaces substantially perpendicular to the screw axis;
    said second thread having a smaller pitch and lead angle as compared to said first thread and being interrupted by axial grooves extending parallel to the screw axis, said axial grooves being spaced circumferentially around the screw axis;
    a screw head element adjacent to said front material discharge portion, said screw head element having a head portion and a shaft portion, said head portion having a plurality of kerfs extending in the direction of the screw axis, said kerfs being spaced circumferentially and arranged out of phase with respect to said axial grooves for accelerating kneading;
    a seal element surrounding and movable axially with respect to said screw head element; and
    a plurality of O-rings disposed on an outer peripheral surface of said seal element.

2. The injection screw according to claim 1, wherein said first threads are generally rectangular in cross section.

3. The injection screw according to claim 1, wherein the number of said axial grooves differs from the number of said kerfs.

4. The injection screw according to claim 1, wherein said first thread has an axial length of approximately 90 mm to 120 mm, a pitch of approximately 15 mm to 25 mm, and a thread depth of approximately 2.5 mm to 2.7 mm; said second thread has an axial length of approximately 30 mm to 70 mm, a pitch of approximately 4.5 mm to 6 mm and a thread depth of approximately 2.2 mm to 2.4 mm; and wherein said axial grooves have a groove width of approximately 2.3 mm to 2.5 mm.

5. The injection screw according to claim 2, wherein the portion of the screw between each flight of said first thread is substantially parallel to the screw axis.

6. The injection screw according to claim 1, wherein said axial grooves are equidistantly spaced.

7. The injection screw according to claim 1, wherein said kerfs are equidistantly spaced.

* * * * *